United States Patent Office 2,909,493
Patented Oct. 20, 1959

2,909,493

METHOD FOR MAKING CELLULAR VINYL CHLORIDE RESINS

Thomas F. Bush, Derby, Conn., assignor to The B. F. Goodrich Company, New York, N.Y., a corporation of New York No Drawing. Application December 19, 1955
Serial No. 553,684

13 Claims. (Cl. 260—2.5)

This invention relates to the manufacture of cellular materials and pertains more particularly to a method for making a cellular vinyl chloride polymer material from a plastisol.

The basic processes for making a vinyl chloride polymer "sponge" or "foam" material from a plastisol are well known. In all of the processes the plastisol is expanded or foamed and then heated to fuse the expanded vinyl chloride polymer. The formation of the cellular structure may be accomplished in various ways. One method of foaming the plastisol is the process wherein a gas (normally carbon dioxide) is dissolved in the plastisol under pressure. Upon releasing the pressure, the dissolved gas expands in the plastisol forming the plastisol into a cellular mass. The plastisol also may be foamed by mechanically beating or whipping air into the plastisol. Chemical blowing agents capable of liberating a gas below a temperature at which the plastisol gels also have been extensively employed in foaming or expanding the plastisol. Although other processes for expanding a plastisol are available, the above-mentioned processing techniques are most widely used.

Heretofore, it has been difficult to control the density and cell size of vinyl chloride polymer "sponge" or "foam" products made from a plastisol. Since the viscosities of plastisols used in the manufacture of "sponge" or "foam" materials are relatively low, the cellular structure of the ungelled foam tends to collapse or break down if the foam is allowed to stand for even a short period of time before the plastisol is gelled and fused. Also, degeneration of the cellular structure of the foamed plastisol heretofore has been experienced when the foamed material is heated to gel and fuse the plastisol.

In accordance with this invention compounding materials are added to the plastisol which react during and/or immediately after the plastisol is foamed to form a reaction product which increases the viscosity of the plastisol sufficiently to minimize degeneration or breakdown of the cellular structure of the ungelled foamed plastisol. Materials which, when added to a plastisol, increase the viscosity of the plastisol normally are referred to as plastisol "thickening agents." It will be understood that this invention does not include the addition of thickening agents as such directly to the plastisol but rather embraces adding to the plastisol materials which react in the plastisol to form thickening agents, since the direct addition of thickening agents to the plastisol during the compounding of the plastisol would "thicken" the plastisol before it could be foamed and thereby seriously hinder satisfactory foaming of the plastisol.

The materials added to the plastisol to form a thickening agent in the plastisol are an aliphatic acid having from 12 to 24 carbon atoms and a reactant which reacts with such aliphatic acids at a temperature below the gelling temperature of the plastisol to form a fatty acid soap. (The term "reactant" when used herein is intended to mean such materials which are capable of reacting with aliphatic acids at a temperature below the gelling temperatures of plastisols to form fatty acid soaps.) Of the aliphatic acids useful in practicing this invention, aliphatic acids having from 16 to 18 carbon atoms are preferred. Reactants capable of reacting with the aliphatic acids used in this invention at temperatures below the gelling temperatures of plastisols to form fatty acid soaps are well known, and include such materials as sodium hydroxide, potassium hydroxide, ammonium hydroxide, calcium hydroxide, barium hydroxide, sodium carbonate, potassium carbonate, and ammonium carbonate. Preferably a reactant which forms an alkali metal fatty acid soap when reacted with an aliphatic acid is used, reactants which form sodium and potassium salts with aliphatic acids being particularly satisfactory. The reactant may consist of two or more materials which react together in the plastisol at a temperature below the gelling temperature of the plastisol to form a reaction product which in turn reacts with the aliphatic acid in the plastisol and forms a fatty acid soap. Preferably a reactant is used which not only is capable of reacting with the aliphatic acid to form a fatty acid soap but also is capable of being decomposed by heat or of reacting with another material in the plastisol to form a gaseous product useful for expanding the plastisol. Sodium borohydride, potassium borohydride, ammonium bicarbonate, sodium bicarbonate, potassium bicarbonate and sodium carbonate are illustrative of reactants which also function as chemical blowing agents for the plastisol.

Since the reaction between most of the aliphatic acids and the reactants useful in this invention normally occurs within a short time even at room temperature (20° C.), care should be exercised in the manner in which the aliphatic acid and reactants are added to the plastisol, so that the plastisol can be frothed or foamed into a cellular mass of uniform cell size before the viscosity of the plastisol is increased to a viscosity at which satisfactory frothing or foaming of the plastisol would be prevented or seriously hindered. If the plastisol is to be frothed by mechanically entraining air in the plastisol, the aliphatic acid and the reactant should be added to the plastisol during or immediately after the frothing of the plastisol. Of course, since the viscosity of the plastisol is not materially increased unless both the aliphatic acid and reactant are present in the plastisol, either the aliphatic acid or the reactant may be added alone to the plastisol before it is frothed. When a chemical blowing agent is employed to expand the plastisol, either the aliphatic acid or reactant can be added to the plastisol at any time during the compounding of the plastisol, but both materials should not be present in the plastisol until immediately before the plastisol is poured into a mold and expanded, unless a two-component mixing procedure is to be used. Preferably, the aliphatic acid and reactant are added to the plastisol by forming two separate plastisol compositions and adding the aliphatic acid to one of the compositions and the reactant to the other composition. The two compositions then are mixed together just prior to pouring the plastisol material into the mold.

The amounts of aliphatic acid having from 12 to 24 carbon atoms and reactant which should be added to the plastisol varies depending upon the plastisol, aliphatic acid and reactant being used and the amount of fatty acid soap which must be formed in the plastisol to effect the desired increase in viscosity of the plastisol. Since the fatty acid soap formed in the plastisol causes the viscosity of the plastisol to be increased, larger quantities of the fatty acid soap must be formed in the plastisol to effect larger increases in viscosity than are required to cause relatively small increases in viscosity.

Any of the vinyl chloride polymer-plasticizer dispersions commonly referred to as plastisols may be used in this invention. A plastisol is defined as a dispersion of vinyl chloride polymer in a liquid plasticizer for the vinyl chloride polymer and may include such additives as colorants, stabilizers, fillers and other modifying agents. Plastisols normally contain at least 35 parts by weight of the liquid plasticizer for every 100 parts by weight of the vinyl chloride polymer, and frequently comprise as much as 300 to 400 or more parts by weight of the liquid plasticizer for every 100 parts by weight of the vinyl chloride polymer. Dioctyl phthalate, butyl decyl phthalate, dioctyl adipate, dioctyl sebacate, tricresyl phosphate, trioctyl phosphate, didecyl phthalate, and acetyl tributyl citrate are typical illustrations of liquid plasticizers useful in forming plastisols. The most commonly used plastisols contain polyvinyl chloride (a homopolymer of vinyl chloride) and/or copolymers of vinyl chloride with vinyl acetate, vinylidene chloride or maleic acid esters as the vinyl chloride polymer constituent, plastisols containing polyvinyl chloride as the vinyl chloride polymer component of the plastisol being particularly useful in this invention.

When a chemical blowing agent is used to expand the plastisol, the chemical blowing agent should be compatible with the plastisol and evolve a gas below the temperature at which the plastisol gels. Chemical blowing agents suitable for expanding plastisols are well known and include p,p'-oxybis-(benzenesulfonyl hydrazide), diazoaminobenzene, dinitroso pentamethylene tetramine, and the like. The bifunctional blowing agents which serve not only as blowing agents for the plastisol but also react with the aliphatic acid in the plastisol to form a fatty acid soap, such as sodium borohydride, potassium borohydride, ammonium carbonate, sodium bicarbonate, potassium bicarbonate, ammonium carbonate, sodium carbonate, etc. are particularly suitable for use in this invention. When using the bifunctional blowing agents, a dilute acid solution can be added to the plastisol to increase the rate of decomposition of the blowing agent. A dilute aqueous solution of acetic acid may be used conveniently. The use of sodium borohydride, potassium borohydride, cesium borohydride and rubidium borohydride as blowing agents for plastisols is described in my copending application Serial No. 553,747, filed December 19, 1955.

The amount of chemical blowing agent required varies depending mainly upon the density desired in the expanded product.

The following examples illustrate the process of this invention. However, it will be understood that the invention is not intended to be limited to these specific illustrations.

*Example 1*

| Material | Parts by Weight | |
|---|---|---|
| | A | B |
| Polyvinyl chloride polymer | 100.0 | 100.0 |
| Butyl benzyl phthalate | 65.0 | 70.0 |
| Dibutyl tin dilaurate | 3.0 | 3.0 |
| 40% dispersion of silicon oxyhydride in dioctyl phthalate | 4.0 | |
| 50% dispersion of stearic acid in dioctyl phthalate | 11.0 | |
| 25% aqueous solution of ammonium hydroxide | | 10.0 |

The components of composition A and the components of composition B are compounded separately in the usual manner to form separate plastisol compositions. Equal proportions of compositions A and B are mixed together and the resulting composite plastisol composition is poured immediately into a mold. The silicon oxyhydride reacts with water evolving hydrogen gas which expands the plastisol into a cellular mass, and the ammonium hydroxide reacts with the stearic acid to form ammonium stearate. The ammonium stearate increases the viscosity of the plastisol to a viscosity at which degeneration of the plastisol cellular mass does not tend to occur. The stable cellular mass is heated to about 340° F. to gel and fuse the plastisol. A cellular product having a uniform cell size and a uniform density of about 14 pounds per cubic foot is formed.

*Example 2*

| Material | Parts by Weight | |
|---|---|---|
| | A | B |
| Polyvinyl chloride polymer | 100.0 | 100.0 |
| Isooctyl isodecyl phthalate | 80.0 | 75.0 |
| 25% dispersion of sodium borohydride in dioctyl phthalate | 4.0 | |
| 4% aqueous solution of acetic acid | | 3.0 |
| 50% dispersion of stearic acid in dioctyl phthalate | | 5.0 |

Composition A and composition B are formed into separate plastisol compositions using conventional compounding methods. Equal proportions of the plastisol compositions A and B are intermixed and poured immediately into a mold. The acetic acid in the plastisol causes sodium borohydride and water to react together at a relatively rapid rate with the evolution of hydrogen gas which expands the plastisol into a cellular mass. Sodium borohydride also reacts with the stearic acid in the plastisol, although at a much slower rate than occurs in the reaction between sodium borohydride and water, to form sodium stearate. The sodium stearate formed in the plastisol causes the vicosity of the plastisol to be increased to a viscosity at which the cellular structure of the expanded ungelled plastisol does not tend to collapse when allowed to stand or when heated to a gelling and fusing temperature. The foamed or expanded plastisol then is heated to about 350° F. to gel and fuse the composition. The resulting product has a cellular structure of uniform cell size and a uniform density of about 12.5 pounds per cubic foot.

*Example 3*

| Material | Parts by Weight | |
|---|---|---|
| | A | B |
| Polyvinyl chloride polymer | 100.0 | 100.0 |
| Butyl benzyl phthalate | 30.0 | 30.0 |
| Dipropylene glycol dibenzoate | 16.0 | 10.0 |
| Dioctyl phthalate | 25.0 | 25.0 |
| Oleic acid | | 5.0 |
| 50% dispersion of ammonium bicarbonate in dioctyl phthalate | 8.0 | |
| 4% aqueous solution of acetic acid | | 4.0 |

The components of composition A and composition B are mixed separately in the usual manner to form two plastisol compositions. Composition A and composition B are mixed together in equal proportions and poured immediately into a mold. The acetic acid in the plastisol mix causes ammonium bicarbonate to decompose rapidly evolving carbon dioxide gas which expands the plastisol into a cellular mass. The oleic acid reacts with ammonium bicarbonate in the plastisol and forms ammonium oleate. The ammonium oleate causes an increase in the viscosity of the foamed plastisol and thereby retards degeneration of the cellular structure of the expanded plastisol. The expanded plastisol is heated to about 350° F. to gel and fuse the plastisol. A cellular product having a density of about 18 pounds per cubic foot is formed.

Example 4

| Material | Parts by Weight | |
|---|---|---|
| | A | B |
| Vinyl chloride-vinylidene chloride copolymer | 100.0 | 100.0 |
| Dioctyl phthalate | 75.0 | 75.0 |
| 25% dispersion of potassium borohydride in dioctyl phthalate | 3.8 | |
| 4% aqueous solution of acetic acid | | 3.0 |
| 50% dispersion of stearic acid in dioctyl phthalate | | 5.0 |

Composition A and composition B are formed separately in the usual manner. Equal proportions of compositions A and B are intermixed and the composite plastisol composition is poured immediately into a mold. The acetic acid solution causes a relatively rapid reaction between potassium borohydride and water to occur with the formation of hydrogen gas which expands the plastisol into a cellular mass. The stearic acid also reacts with potassium borohydride, but at a much slower rate than occurs in the reaction between the potassium borohydride and water, to form potassium stearate. The potassium stearate thickens the plastisol to a viscosity at which the ungelled plastisol foam is stable even when the plastisol is heated to a gelling and fusing temperature. The expanded plastisol is heated to a temperature of about 345° F. to gel and fuse the plastisol. The expanded product has uniform cell size and a uniform density of about 13 pounds per cubic foot.

Example 5

Material: Parts by weight
- Vinyl chloride-vinyl acetate polymer _____ 100.0
- 50% dispersion of n,n'dimethyl-n,n'-dinitroso terephthalamide in dioctyl phthalate _____ 5.0
- Didecyl phthalate _____ 100.0
- Dibutyl tin dilaurate _____ 2.5
- Ricinoleic acid _____ 5.0
- 50% aqueous solution of potassium hydroxide _____ 6.0

The ingredients with the exception of the ricinoleic acid and potassium hydroxide solution are blended together in the usual manner. The ricinoleic acid and aqueous solution of potassium hydroxide are mixed into the plastisol separately and the resulting plastisol composition is poured immediately into a mold which is heated to a temperature of about 205° F. to cause decomposition of the n,n'dimethyl-n,n'-dinitroso terephthalamide with the evolution of nitrogen gas which expands the plastisol into a cellular structure. The plastisol should be heated and expanded immediately after being poured in the mold. The potassium hydroxide reacts with the ricinoleic acid forming potassium ricinoleate which stabilizes the plastisol foam against foam degeneration by increasing the viscosity of the plastisol. The expanded plastisol is heated to about 335° F. to gel and fuse the plastisol into a cellular product of uniform cell size and uniform density.

Example 6

| Material | Parts by Weight | |
|---|---|---|
| | A | B |
| Vinyl chloride-maleic acid ethyl ester copolymer | 80.0 | 80.0 |
| Vinyl chloride-vinylidene chloride polymer | 20.0 | 20.0 |
| Didecyl phthalate | 85.0 | 85.0 |
| 30 parts by weight sodium borohydride, 70 parts by weight 5% aqueous sodium hydroxide | 1.5 | |
| 50% dispersion of palmitic acid in dioctyl phthalate | | 15.0 |

Plastisol compositions A and B are formed in the usual manner. Equal parts of composition A and composition B are mixed together and the composite plastisol composition is poured immediately into a mold. Sodium borohydride and water in the plastisol react together forming hydrogen gas which expands the plastisol into a cellular structure. Sodium borohydride also reacts with palmitic acid to form sodium palmitate. The viscosity of the plastisol is increased by the sodium palmitate formed in the plastisol to a viscosity at which the plastisol foam is stable. The expanded plastisol is heated to about 325° F. to gel and fuse the plastisol. The fused product has a uniform density and a uniform cell size.

A sufficient quantity of a fatty acid soap can be formed in the plastisol at room temperature by the process of this invention to raise the viscosity of the expanded plastisol sufficiently so that the cellular structure of the plastisol will not appreciably degenerate even when allowed to stand for relatively long periods of time before the plastisol is gelled and fused. As a result, the expanded plastisol need not be gelled and fused immediately after it is foamed but may be gelled and fused at any convenient time after the plastisol is expanded.

The process of this invention may be used for making continuous sheets of vinyl chloride polymer sponge by pouring the unexpanded plastisol onto a moving conveyor and allowing it to expand thereon. Thereafter, the expanded plastisol is gelled and fused by heating the expanded material on the conveyor to a gelling and fusing temperature.

It is clear that obvious modifications and variations of this invention may be made without departing from the spirit and scope of the invention as defined in the appended claims.

I claim:

1. A method for making a cellular material from a plastisol composition containing a vinyl chloride polymer and a liquid plasticizer for said vinyl chloride polymer which comprises forming a fatty acid soap in situ in said plastisol composition by adding to said plastisol composition an aliphatic mono-carboxylic acid having from 12 to 24 carbon atoms and a basic reactant for reacting with said aliphatic acid at a temperature below the gelling temperature of said plastisol composition to form a fatty acid soap, foaming said plastisol composition to form said plastisol composition into a cellular structure, and heating the foamed plastisol composition to gel and fuse the foamed plastisol composition.

2. A method for making a cellular material from a plastisol composition containing a vinyl chloride polymer and a liquid plasticizer for said vinyl chloride polymer which comprises forming a fatty acid soap in situ in said plastisol composition by adding to said plastisol composition an aliphatic mono-carboxylic acid having from 16 to 18 carbon atoms and a basic reactant for reacting with said aliphatic acid at a temperature below the gelling temperature of said plastisol composition to form a fatty acid soap, foaming said plastisol composition to form said plastisol composition into a cellular structure, and heating the foamed plastisol composition to gel and fuse the foamed plastisol composition.

3. A method for making a cellular material from a plastisol composition containing polyvinyl chloride polymer and a liquid plasticizer for said polyvinyl chloride polymer which comprises forming a fatty acid soap in situ in said plastisol composition by adding to said plastisol composition an aliphatic mono-carboxylic acid having from 12 to 24 carbon atoms and a basic reactant for reacting with said aliphatic acid at a temperature below the gelling temperature of said plastisol composition to form a fatty acid soap, foaming said plastisol composition to form said plastisol composition into a cellular structure, and heating the foamed plastisol composition to gel and fuse the foamed plastisol composition.

4. A method for making a cellular material from a plastisol composition containing a vinyl chloride polymer and a liquid plasticizer for said vinyl chloride polymer which comprises forming an alkali metal fatty acid soap in situ in said plastisol composition by adding to said plastisol composition an aliphatic mono-carboxylic acid having from 12 to 24 carbon atoms and a basic reactant for reacting with said aliphatic acid at a temperature below the gelling temperature of said plastisol composition to form an alkali metal fatty acid soap, foaming said plastisol composition to form said plastisol composition into a cellular structure, and heating the foamed plastisol composition to gel and fuse the foamed plastisol composition.

5. A method for making a cellular material from a plastisol composition containing a vinyl chloride polymer and a liquid plasticizer for said vinyl chloride polymer which comprises forming a fatty acid soap in situ in said plastisol composition by adding to said plastisol composition an aliphatic mono-carboxylic acid having from 12 to 24 carbon atoms and a basic reactant for reacting with said aliphatic acid at a temperature below the gelling temperature of said plastisol composition to form a fatty acid soap, foaming said plastisol composition to form said plastisol composition into a cellular structure by liberating gas bubbles in the plastisol composition at a temperature below the gelling temperature of the said plastisol composition, and heating the foamed plastisol composition to gel and fuse the foamed plastisol composition.

6. A method for making a cellular material from a plastisol composition containing a polyvinyl chloride polymer and a liquid plasticizer for said polyvinyl chloride polymer which comprises adding an aliphatic mono-carboxylic acid having from 12 to 24 carbon atoms, sodium borohydride and water to said plastisol composition to expand the said plastisol composition into a cellular structure and to form a fatty acid soap in the plastisol composition which increases the viscosity of the plastisol composition, and heating the expanded plastisol composition to gel and fuse the plastisol composition.

7. A method for making a cellular material from a plastisol composition containing polyvinyl chloride polymer and a liquid plasticizer for said polyvinyl chloride polymer which comprises adding an aliphatic mono-carboxylic acid having from 12 to 24 carbon atoms, potassium borohydride and water to said plastisol composition to expand the said plastisol composition into a cellular structure and to form a fatty acid soap in the plastisol composition which increases the viscosity of the plastisol composition, and heating the expanded plastisol composition to gel and fuse the plastisol composition.

8. A method for making a cellular material from a plastisol composition containing polyvinyl chloride polymer and a liquid plasticizer for said polyvinyl chloride polymer which comprises adding an aliphatic mono-carboxylic acid having from 12 to 24 carbon atoms, ammonium bicarbonate and acetic acid to said plastisol composition to expand the said plastisol composition into a cellular structure and to form a fatty acid soap in the plastisol composition which increases the viscosity of the plastisol composition, and heating the expanded plastisol composition to fuse the plastisol composition.

9. A method for making a cellular material from a plastisol composition containing a vinyl chloride polymer and a liquid plasticizer for said vinyl chloride polymer which comprises forming a fatty acid soap in situ in said plastisol composition by forming two plastisol components containing vinyl chloride polymer, adding an aliphatic mono-carboxylic acid having from 12 to 24 carbon atoms to one of said plastisol components, adding a basic reactant for reacting with said aliphatic acid at a temperature below the gelling temperature of said plastisol composition to form a fatty acid soap to the other said plastisol component, and combining the two said plastisol components to form a single composite plastisol composition, foaming said composite plastisol composition to form said composite plastisol composition into a cellular structure by liberating gas bubbles in the composite plastisol composition at a temperature below the gelling temperature of the said composite plastisol composition, and heating the said expanded composite plastisol composition to gel and fuse the plastisol composition.

10. A method for making a cellular product from a plastisol containing a vinyl chloride polymer and a liquid plasticizer for said vinyl chloride polymer which comprises forming two plastisol compositions containing vinyl chloride polymer, adding an aliphatic mono-carboxylic acid having from 12 to 24 carbon atoms and water to one of the said plastisol compositions, adding sodium borohydride to the other said plastisol composition, combining the two said plastisol compositions to form a single composite plastisol, allowing the composite plastisol material to expand, and heating the expanded plastisol to gel and fuse the plastisol.

11. A method for making a cellular product from a plastisol containing a vinyl chloride polymer and a liquid plasticizer for said vinyl chloride polymer which comprises forming two plastisol compositions containing vinyl chloride polymer, adding an aliphatic mono-carboxylic acid having from 12 to 24 carbon atoms and water to one of the said plastisol compositions, adding potassium borohydride to the other said plastisol composition, combining the two said plastisol compositions to form a single composite plastisol, allowing the composite plastisol material to expand, and heating the expanded plastisol to gel and fuse the plastisol.

12. A method for making a cellular product from a plastisol containing a vinyl chloride polymer and a liquid plasticizer for said vinyl chloride polymer which comprises forming two plastisol compositions containing vinyl chloride polymer, adding an aliphatic mono-carboxylic acid having from 12 to 24 carbon atoms and silicon oxyhydride to one of the said plastisol compositions, adding ammonium hydroxide to the other said plastisol composition, combining the two said plastisol compositions to form a single composite plastisol, allowing the composite plastisol material to expand, and heating the expanded plastisol to gel and fuse the plastisol.

13. A method for making a cellular product from a plastisol containing a vinyl chloride polymer and a liquid plasticizer for said vinyl chloride polymer which comprises forming two plastisol compositions containing vinyl chloride polymer, adding an aliphatic mono-carboxylic acid having from 12 to 24 carbon atoms and an aqueous solution of acetic acid to one of the said plastisol compositions, adding ammonium bicarbonate to the outer said plastisol composition, combining the two said plastisol compositions to form a single composite plastisol, allowing the composite plastisol material to expand, and heating the expanded plastisol to gel and fuse the plastisol.

References Cited in the file of this patent

UNITED STATES PATENTS

| 2,386,995 | Wigal | Oct. 16, 1945 |
| 2,758,980 | Talalay et al. | Aug. 14, 1956 |

FOREIGN PATENTS

| 135,025 | Australia | Nov. 2, 1949 |

OTHER REFERENCES

"Chemical Engineering," volume 59, No. 11, pages 204 and 206, November 1952.